United States Patent [19]
Klinkowstein

[11] Patent Number: 5,008,800
[45] Date of Patent: Apr. 16, 1991

[54] HIGH VOLTAGE POWER SUPPLY

[75] Inventor: Robert W. Klinkowstein, Winchester, Mass.

[73] Assignee: Science Research Laboratory, Inc., Somerville, Mass.

[21] Appl. No.: 488,744

[22] Filed: Mar. 2, 1990

[51] Int. Cl.⁵ .............................................. H02M 7/25
[52] U.S. Cl. ...................................... 363/61; 363/68; 363/126; 363/144
[58] Field of Search ....................... 363/59, 60, 61, 68, 363/126, 144; 310/68 D; 361/388, 396

[56] References Cited

U.S. PATENT DOCUMENTS

| | | | |
|---|---|---|---|
| 3,629,631 | 12/1971 | Cotton et al. | 310/68 D |
| 3,812,390 | 5/1974 | Richards | 310/68 D |
| 3,927,338 | 12/1975 | Vieilleribiere | 310/68 D |
| 4,338,657 | 7/1982 | Lisin et al. | 363/68 |
| 4,389,703 | 6/1983 | Morel et al. | 363/61 |
| 4,393,441 | 7/1983 | Enge | 363/61 |

Primary Examiner—Peter S. Wong
Attorney, Agent, or Firm—Wolf, Greenfield & Sacks

[57] ABSTRACT

A high voltage multistage cascade rectifier power supply is provided which maintains uniform potential between the stages of the rectifier, and thus uniformly grades the electric potential, by providing equipotential conductor plates on each side of each stage of the power supply. The plates include both AC and DC plates, with capacitors being provided between each pair of plates defining a stage. Discrete capacitors may be provided between each pair of plates or the plates may form part of the capacitors with dielectric material being provided between the plates. The plates are selectively interconnected by diodes to form the cascade rectifier. Stray capacitance in the cascade rectifier is compensated for with an inductor across the input to the rectifier, which inductor is selected to tune out the stray capacitance. The frequency of the input drive may be automatically adjusted to compensate for changes in the system, including changes in stray capacitance.

30 Claims, 5 Drawing Sheets

HIGH VOLTAGE POWER SUPPLY

FIELD OF THE INVENTION

This invention relates to high voltage power supplies and more particularly to high voltage multistage cascade rectifier power supplies which provide high per stage voltage gradients.

BACKGROUND OF THE INVENTION

There are many applications in, for example, industry, science and medicine where a high voltage power supply capable of generating over 200 kilovolts at a current in the milliamp range, for example, 5 ma (i.e., over one kilowatt of output power) are required. While a number of high voltage power supply designs are available, a multistage cascade rectifier power supply is the preferred design for many such applications, offering the best cost-performance ratios.

In a multistage cascade rectifier power supply, each capacitor rectifier stage has a more or less predetermined voltage gradient and a desired output voltage is obtained by utilizing the number of such stages which is required in order to achieve the desired output level. However, voltage droop in such a power supply (i.e., the DC voltage drop with load) increases as the cube of the number of stages and the voltage ripple, the fluctuation in the output voltage with load (i.e., the AC component o the high voltage output) increases linearly with the number of stages. The component and assembly costs of the power supply also increase with the number of stages.

It is therefore desirable that the voltage gradient per stage be as high as possible so as to minimize the number of stages required to achieve a given voltage output. There are, however, several problems in designing a high gradient cascade rectifier power supply. First, the electrical field stresses produced for each stage must be maintained below the breakdown value of the insulating gas, the capacitors, and any other materials which form part of the stages so as to avoid any breakdown in a given stage. One problem in assuring that breakdown does not occur is that, even though the average potential gradient of a stage may be well below the component breakdown values, nonuniformities may occur in the field which can result in local "hot spots" where breakdown may occur.

A second factor is that a high gradient cascade rectifier design is characterized by the inequality:

$$V_i^2 f > \frac{P_o}{4 \Pi C_s} \quad (1)$$

where:

$V_i$ is the RMS input drive voltage to the rectifier, f is the driving frequency, $P_o$ is the DC power delivered to the load and $C_s$ is the stray shunt capacitance of the power supply at the input drive terminals. When the above inequality is satisfied, the shunt reactive input impedance is smaller than the shunt resistive input impedance, the shunt reactive input impedance resulting primarily from the stray capacitance of the cascade rectifier structure. There are a number of advantages in designing a cascade rectifier power supply which satisfies the above inequality. When compared to cascade rectifier designs which do not satisfy this inequality, such designs typically offer more voltage per inch and thus more voltage per stage, operate at higher frequency, and, requiring fewer stages, minimize voltage droop and ripple. However, in practice it is difficult to design efficient cascade rectifiers which satisfy this inequality. In particular, in order for such a rectifier design to be practical, the stray capacitance must be "tuned out" to a sufficient degree at the driving frequency.

SUMMARY OF THE INVENTION

It is therefore an object of this invention to provide an improved cascade rectifier power supply design which provides a high voltage gradient per stage by assuring that the breakdown voltage of the materials is not exceeded at any point in any stage of the cascade rectifier and by designing the rectifier to satisfy the inequality indicated above by tuning out stray capacitance at the driving frequency.

More particularly, this invention provides a high voltage, multistage cascade rectifier power supply which maintains equipotential planes between stages, and thus uniformly grades the electric potential, by providing conductor plate means on each side of each stage of the power supply. Each conductor plate means includes AC potential plates and DC potential plates. Capacitor means are provided between both the AC plates and the DC plates defining each stage. First rectifier means selectively interconnect the DC plate of a conductor plate means defining a given stage to the AC plate or plates of the other conductor plate means defining the stage; and second rectifier means are provided for selectively interconnecting the AC and DC plates of a given conductor plate means. Each plate means may be in the form of a plurality of spaced generally arc-shaped plates arranged to form a split ring, which ring is preferably circular. Alternatively, the DC plate may be circular with a pair of spaced openings, the AC plate(s) either being positioned in the openings or being offset from the DC ring with the capacitors for the AC plate(s) passing through the openings. The capacitators may either be discrete capacitors connected between corresponding conductor plates of the two plate means defining each stage, or the capacitor means may be formed with the corresponding conductor plates of the two plate means defining each stage serving as the plates for the capacitor and dielectric means substantially filling the space between such corresponding plates.

The power supply is preferably designed to satisfy the inequality of equation 1 above, and means are preferably provided for tuning out the stray capacitance at a selected frequency, such as the frequency of the input drive voltage. A step up driver transformer may be provided between the source of input drive voltage and the cascade rectifier, with the input drive voltage being applied to the transformer primary winding, the output from the transformer secondary winding being connected as the input drive voltage to the first stage of the power supply, and the means for tuning out including an inductor of suitable value connected across a winding, for example the primary winding, of the transformer. A means for automatically adjusting the frequency of the input drive to compensate for changes in stray capacitance or "tuning" inductor of the power supply may also be provided.

The foregoing and other objects, features and advantages of the invention will be apparent from the following more particular description of preferred embodiments of the invention as illustrated in the accompanying drawings.

IN THE DRAWINGS

DETAILED DESCRIPTION

As previously indicated, one substantial problem in designing high gradient cascade rectifier power supplies is to assure that the electric field stresses are maintained below the breakdown potential of all of the materials which form each stage of the rectifier. While the breakdown potential of the various elements is usually known, permitting the nominal potential of each stage to be maintained below the breakdown potential of all materials utilized, nonuniformities in the electric field may create local "hotspots" where breakdown can occur. Therefore, to permit operation near the breakdown potential of the materials forming the cascade rectifier, it is important that the rectifier be designed such that the electric field is uniform throughout each stage and from stage to stage.

Figure 1:
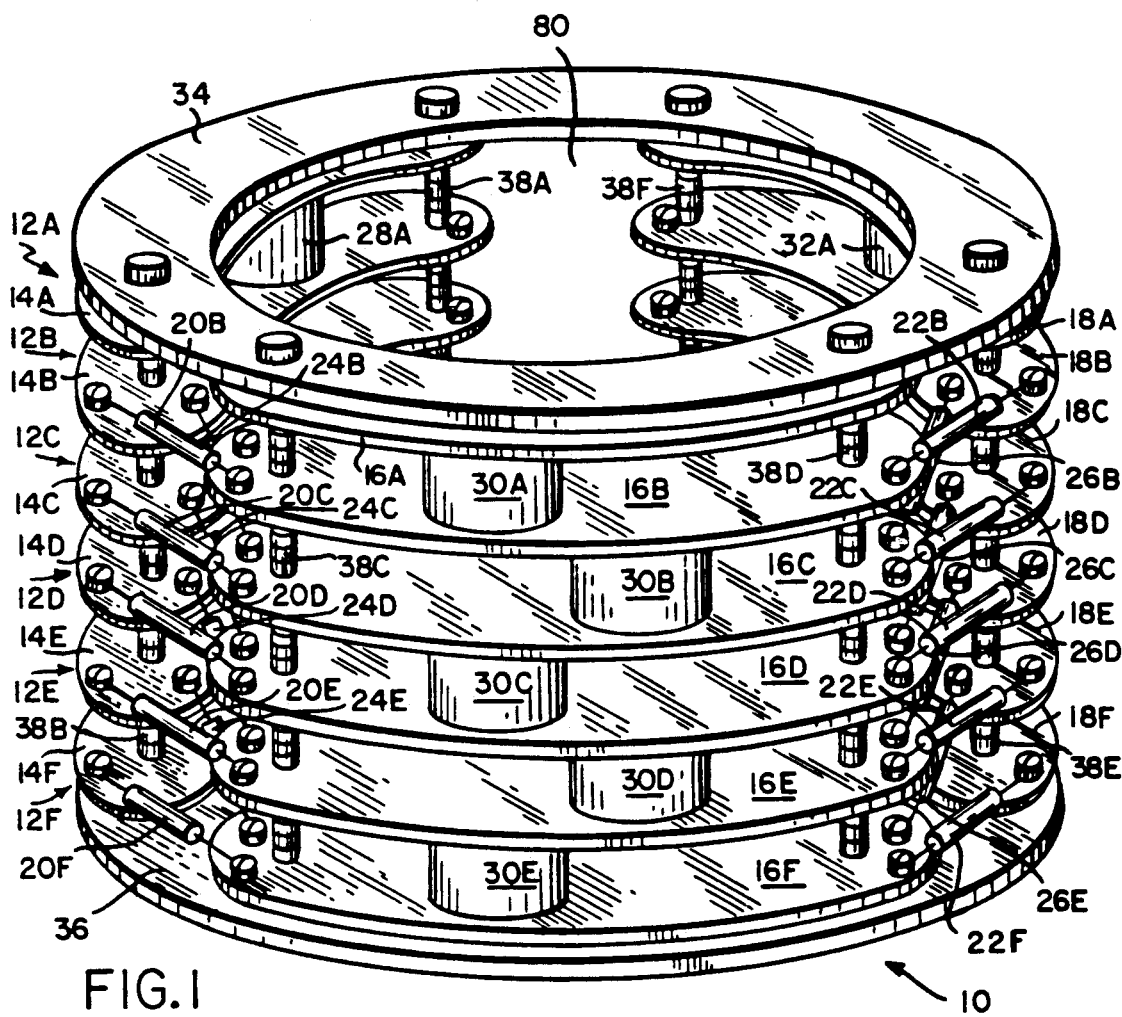
FIG. 1 is a front top perspective view of a cascade rectifier power supply constructed in accordance with the teachings of this invention.

FIG. 1 shows a cascade rectifier power supply design which achieves this objective. Referring to FIG. 1, a five stage power supply 10 is shown wherein mounting plates 12 are provided on each side of each stage. While in the discussion to follow, the plates 12 are indicated as being formed of a conducting metal, the plates 12 could also be formed of other conducting material. As may be better seen in FIG. 2, each plate 12 is formed of three arc shaped metal plates 14, 16 and 18 which are arranged in the form of a split ring. The outer plates 14 and 18 are AC plates having AC potentials superimposed on a DC level appearing thereat. The plate 16 is a DC plate which, as will be discussed later, is at a potential roughly mid-way between the superimposed DC potential at the corresponding AC plates 14 and 18 and the superimposed DC potential for the AC plates of the next lower plate 12. The plates 14 and 16 of each plate 12 are connected by a rectifier, such as a solid state diode 20, and the plates 16 and 18 of each plate 12 are connected by a diode or other rectifier 22. Similarly, the DC plates 16F 16B are each connected to the AC plate 14E 14A, respectively, (i.e., the AC plate 14 of the next higher plate 12) by a rectifier 24, and the DC plates 18F-18B are connected to the AC plates 18E 18A respectively of the next higher plate 12 by a rectifier 26. A discrete capacitor 28 is both physically and electrically connected between each pair of plates 14, a discrete capacitor 30 is connected between each adjacent pair of plates 16; and a discrete capacitor 32 is connected between each adjacent pair of plates 18. External mounting rings 34 and 36 of an insulating or dielectric material are provided at the top and bottom, respectively, of the assembly, and the entire assembly is held together by mounting posts 38 which pass through the support rings 34 and 36, and through a point near each end of each of the plates 14, 16 and 18.

Figure 2:
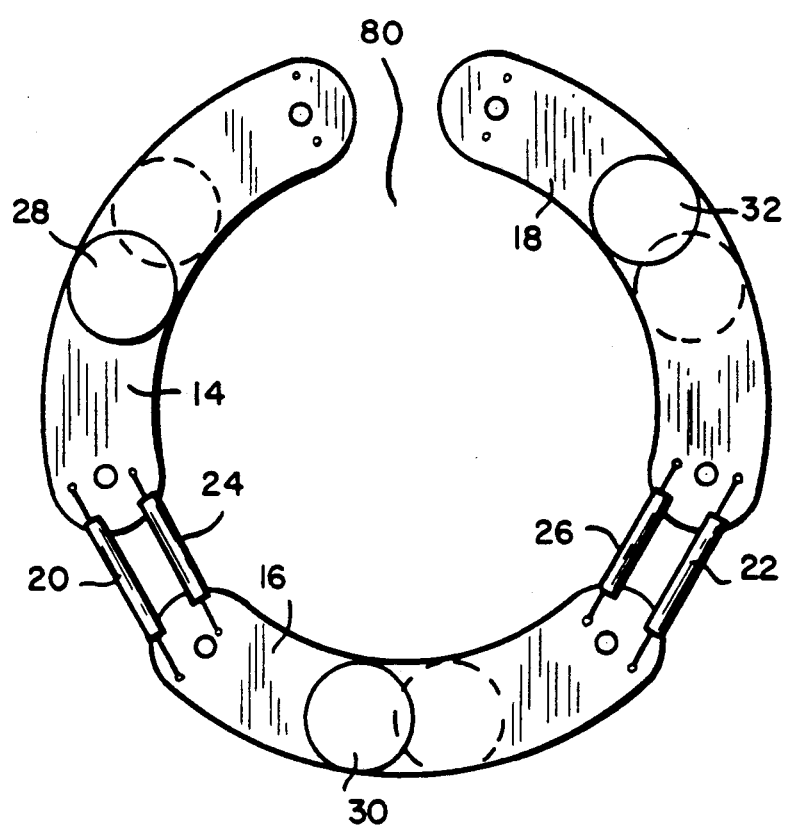
FIG. 2 is a top view of the plates and rectifiers of the power supply shown in FIG. 1.
Figure 3:
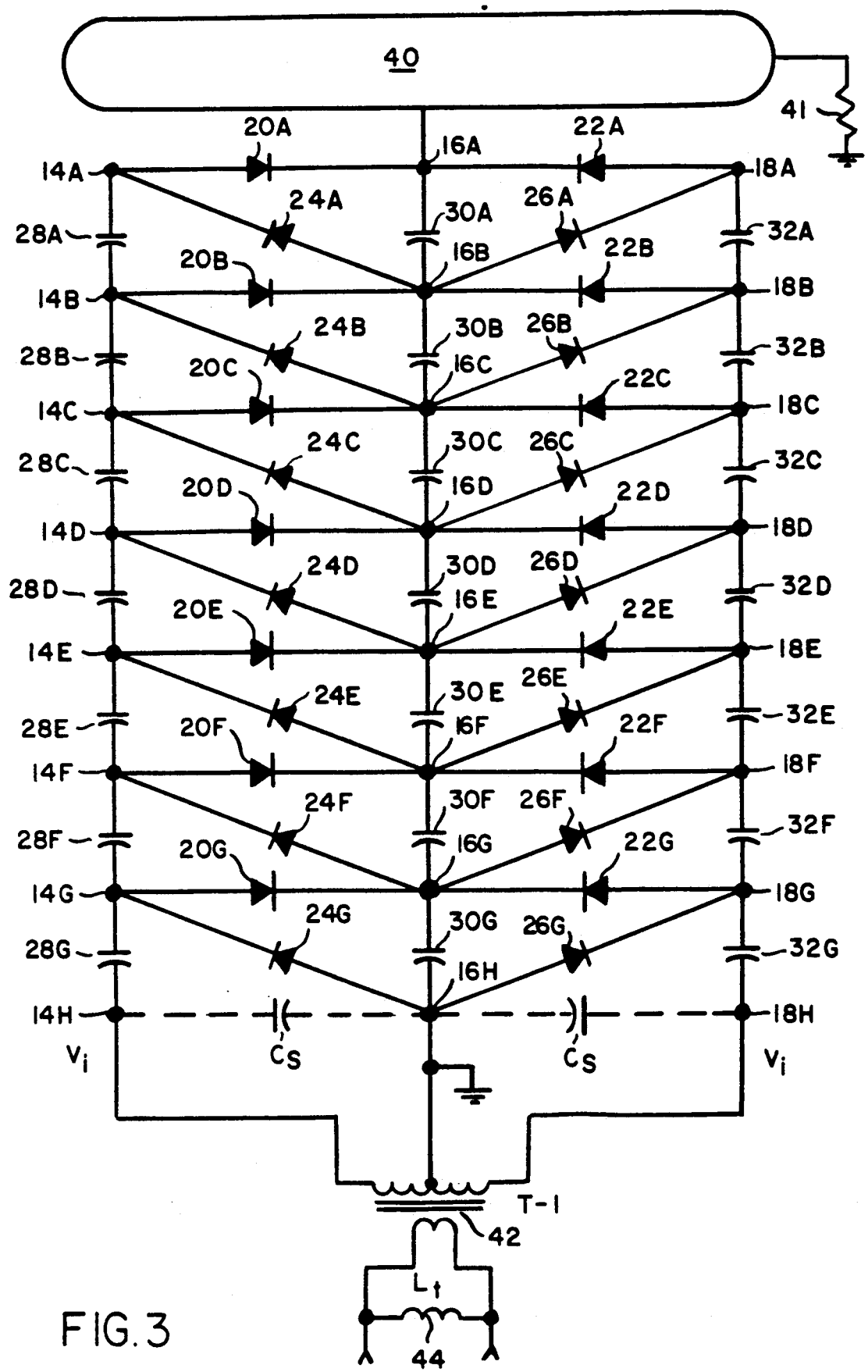
FIG. 3 is a semi-block schematic diagram of a positive polarity cascade rectifier such as that shown in FIG. 1, and of related components in accordance with the teachings of this invention.

FIG. 3 illustrates how the various components described in conjunction with FIGS. 1 and 2 are electrically interconnected to form a standard symmetrical cascade rectifier. The nodes in FIG. 3 correspond to the plates 14, 16 and 18 and are numbered accordingly. The electrical input potential $V_i$ is applied, for example, across AC plates 14F and 18F. The output potential to load 41 may, for example, be taken from DC plate 16A or a high voltage terminal 40 electrically connected to plate 16A. As is known in the art, the DC potential at each node or plate 16 is equal to the peak potential (i.e. the superimposed DC level plus the maximum or peak AC level) appearing at the corresponding AC nodes or plates 14 and 18. The input potential $V_i$ is obtained from the split secondary windings of step up transformer 42. An inductor 44 having an inductance $L_t$ is connected across the primary winding of transformer 42. As will be described in greater detail later, the function of inductor 44 is to "tune out" the stray capacitance $C_S$ of the cascade rectifier at the frequency f of the drive potential applied to the primary of transformer 42 (and thus the frequency of the drive potential applied to the cascade rectifier). This inductor may also appear across the secondary of the transformers, but, because of the lower potential across primary, this is the preferred location. While the stray capacitance appears throughout the cascade rectifier, for purposes of illustration it is shown in dotted lines as a pair of lumped capacitors $C_S$ in FIG. 3.

Figure 4:
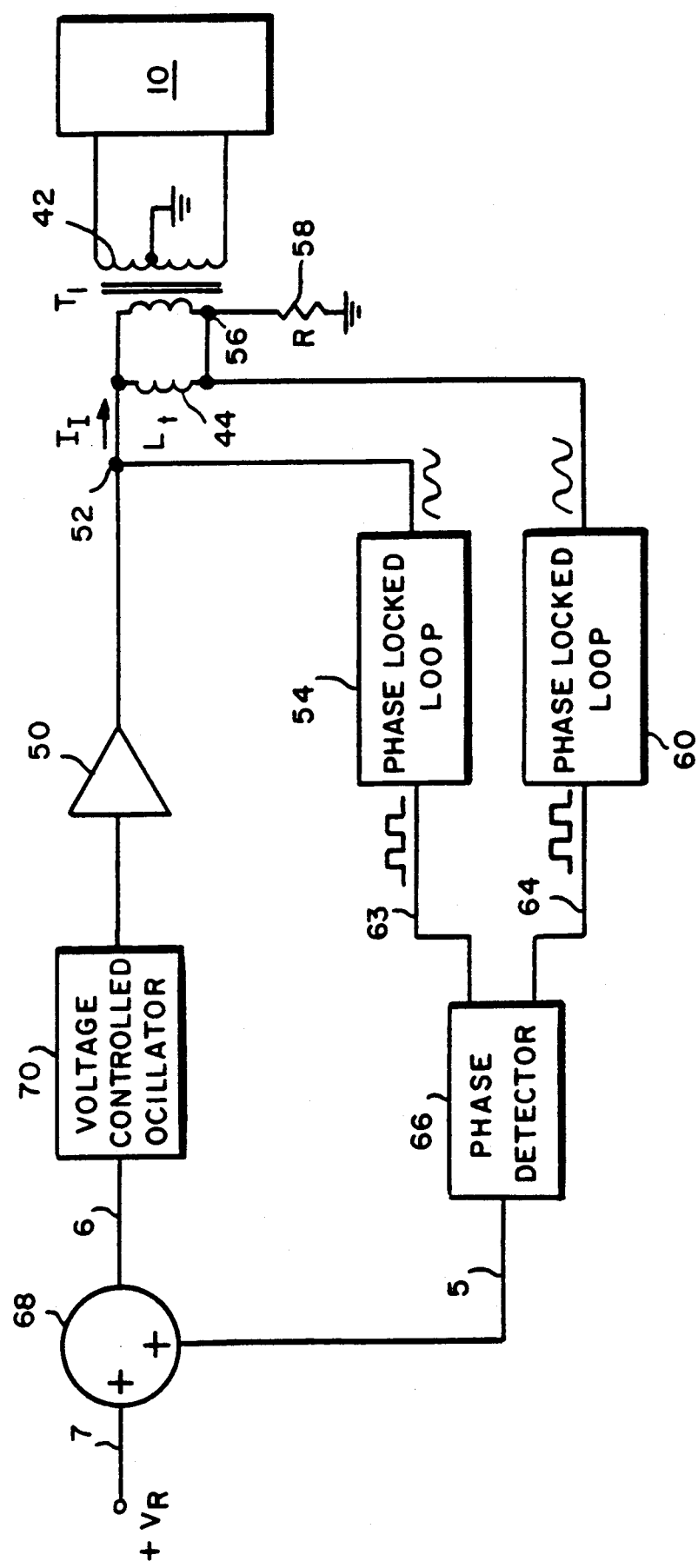
FIG. 4 is a semi block schematic diagram of a self tuning driver circuit suitable for use with the cascade rectifier power supply of this invention.

One potential problem with the cascade rectifier shown in FIG. 3 is that the stray capacitance $C_S$ and the inductance of inductor 44 may vary with time. Therefore, it is possible that the stray capacitance will not always be "tuned out" by the inductor 44, adversely affecting the operation of the system. While it might be possible to overcome this problem by utilizing a tunable inductor for the inductor 44, variations in stray capacitance are not easy to detect nor is it easy to electronically adjust inductance values. Therefore, in FIG. 4, this problem is dealt with by providing a self tuning driver circuit, the frequency of which may be adjusted to compensate for variations in stray capacitance. As is known from basic electrical circuit theory, when a circuit is driven at its resonant frequency, as would be the case when the value of inductor 44 completely tunes out the stray capacitance, the voltage waveform and current waveform at the driving terminals are in phase. When the circuit is driven at a frequency below its resonant frequency, the voltage waveform leads the current waveform and, when the circuit is driven at a frequency above the resonant frequency, the voltage waveform lags the current waveform. FIG. 4 shows a circuit which takes advantage of this principal to automatically adjust the frequency of the voltage drive to the cascade rectifier to the resonant frequency of inductor 44 and the then existing stray capacitance value of the cascade rectifier 10.

Referring to FIG. 4, high frequency power is delivered to the primary winding of transformer 42 from the output of a conventional power amplifier circuit 50. The voltage waveform $V_p$ across the primary winding of transformer 42 is monitored at node 52 and is applied as an input to phase locked loop 54. Similarly, the current waveform $I_p$ through the primary winding is monitored at a node 56 by measuring the voltage waveform across a small value resistor 58, this voltage waveform (representative of the current waveform) being applied as the input to phase locked loop 60. Phase locked loop circuits 54 and 60 may be conventional integrated circuit devices (for example, National Semiconductor Model LM565). Loops 54 and 60 produce phase locked waveforms representative of the voltage waveform and the current waveform, respectively, at their outputs 62 and 64, which are applied as the inputs to phase detector 66. Phase detector 66 may also be a conventional integrated circuit device (for example, National Semiconductor Model LM565) and produces a DC voltage level at its output which depends on the phase difference of the voltage waveforms at is inputs. When the inputs to detector 66 are in phase, the voltage at the output from this circuit is zero. When the waveform on line 62 leads the waveform on line 64, the DC voltage output from phase detector 66 is a positive value which depends on the phase difference of these two signals. Similarly, when the waveform on line 62 lags the waveform on line 64, the voltage output from phase detector 66 is a negative value which depends on the phase difference between these two signals. The voltage VD at the output from the phase detector is thus related to the phase difference of the voltage and current waveforms at its input by the following functional relationship:

$$V_D = K \sin(\theta_v - \theta_i) \quad (2)$$

where K is a constant which depends on the detailed design of the phase detector circuit and $\theta_v$ and $\theta_i$ are the phase of the high voltage waveform and current waveform respectively.

The DC output voltage from phase detector 66 is applied as one input to summing amplifier 68. The output from summing amplifiers 68 is a DC voltage which is applied to control the frequency of voltage controlled oscillator 70 which in turn applies an AC signal to control the drive frequency of power amplifier 50. Summing amplifier 68 may be of conventional design and voltage controlled oscillator 70 may be any of a number of existing circuits for performing this function (for example, National Semiconductor Model LM566). The other input to summing amplifier 68 is a reference volta $V_R$ which is selected to set the initial frequency of voltage controlled oscillator 70. The voltage at the output from phase detector 66, when added to the voltage $V_R$ causes the output voltage from summing amplifier 68 to be increased or decreased according to the relative phase difference of the voltage and current waveforms being monitored at the primary winding of transformer 42. The drive circuit shown in FIG. 4 is thus adapted to automatically adjust its frequency to the resonant frequency of the cascade rectifier circuit.

In operation, the plates 12 serve to establish equipotentials which uniformly grade the electric potential. Thus, there is a uniform potential at each of the plates 12 which substantially eliminates electric field hot spots in the cascade rectifier, thus minimizing the potential for breakdown. The plates 12 also assure a substantially uniform potential gradient across the entire power supply 10. Further, the unused region 80 near the axis of the assembly is also uniformly graded and therefore provides an ideal location for mounting other high voltage assemblies such as high voltage terminal monitor or for mounting the load 41.

The plates 12 may be formed of any suitable metal such as aluminum, stainless steel or copper. For the preferred embodiment, the plates are formed of aluminum. The rods 28 are of a dielectric material such as Delian, nylon or the like. Since breakdown can occur at the surfaces of these rods, the rods are shaped with a threaded surface to minimize this potential problem. Forming threads on the rods minimizes the problem since breakdown occurs when a free electron breaks free and migrates under the influence of the field. The threaded surface provides a potential hit area to stop the movement of such free electrons and therefore inhibits breakdown.

While air can be utilized as the gas in the space between plates 12, it is preferable to use a gas having a higher breakdown potential such as dry nitrogen or sulphur hexafluoride. This requires that the cascade rectifier be maintained in a sealed chamber. This also permits the gas to be pressurized which further enhances the breakdown strength of the gas. For a given gas at a given pressure, the spacing between the plates 12 is the determining factor in breakdown potential, the greater the spacing, the higher the breakdown potential.

Another potential source of breakdown is the capacitors 28-32. Ceramic capacitors (barium titante or strontium titante) are available with nominal breakdown ratings of 50 kv and capacitances of up to 10,000 picofarads. While with such capacitors, breakdown will not occur though the capacitor itself, there is a possibility of breakdown occuring at the capacitor-gas interface. The likelihood of such breakdown can be reduced by selecting the shape of the capacitor to eliminate any sharp edges. As previously discussed with respect to the rods 38, serrating the surface of the capacitors may also contribute to reduced breakdown at such surfaces.

Thus, by utilizing the plates 12 to force the electric field gradient at all points throughout the structure 10 to be uniform, thus eliminating local hot spots, by carefully selecting the components utilized to assure that their breakdown potential exceeds the desired voltage gradient per stage, and by carefully designing the components to minimize breakdown at component surfaces, a cascade rectifier which can achieve optimum high gradient performance is obtained. The design discussed above is theoretically capable of operating with a voltage gradient per stage of up to 50 kv.

The resonant frequency f of the circuit shown in the figures is given by the equation $$f \approx (\Pi N_t \sqrt{2L_t C_s})^{-1} \quad (3)$$

where $N_t$ is the turns ratio of transformer 42. This resonance must have a sufficiently high Q if the shunt reactive power loss is to be smaller than the power delivered to the load. Thus, $$Q > \frac{4\Pi V_i^2 f C_s}{P_o} \quad (4)$$

The no-load terminal voltage at the output of the circuit shown in the figures is given by the equation $$V = 2\sqrt{2}\, V_i N \tag{5}$$

where N is the number of stages.

As an example of performance achievable with the circuit shown in FIGS. 1-4, assume that the droop is given by the equation $$V_{droop} = \frac{I(2N^3 + 3N^2 + N)}{12fC} \tag{6}$$

and that for the value to be given it is approximately 10 kv. Thus, in order to achieve a deliverable output of 250 kv, it is necessary for the circuit to be able to produce 260 kv. Thus, for a seven-stage cascade rectifier such as is shown in FIG. 3, this would require a voltage gradient of approximately 37.2 kv per stage. Assuming that power amplifier 50 is a solid state, 20 kilohertz, 160 volts RMS, 12 amp RMS drive circuit, each half of the step-up transformer would have a 1 to 140 turns ratio. The transformer is a low-loss design utilizing a ferrite core material. This results in an output of approximately 18.6 kv RMS on each half of the secondary transformer, which is applied as the input to the first stage of the rectifier 10. The cascade rectifier can then generate an output of approximately 250 kv with a structure of approximately 8 to 10 inches from bottom to top as opposed to prior art systems which need a structure of approximately two feet to generate a 200 kv output. The difference is in the reduced number of stages required as a result of the high gradient operation as well as the reduced spacing required per stage as a result of the design of this invention.

Figure 5:
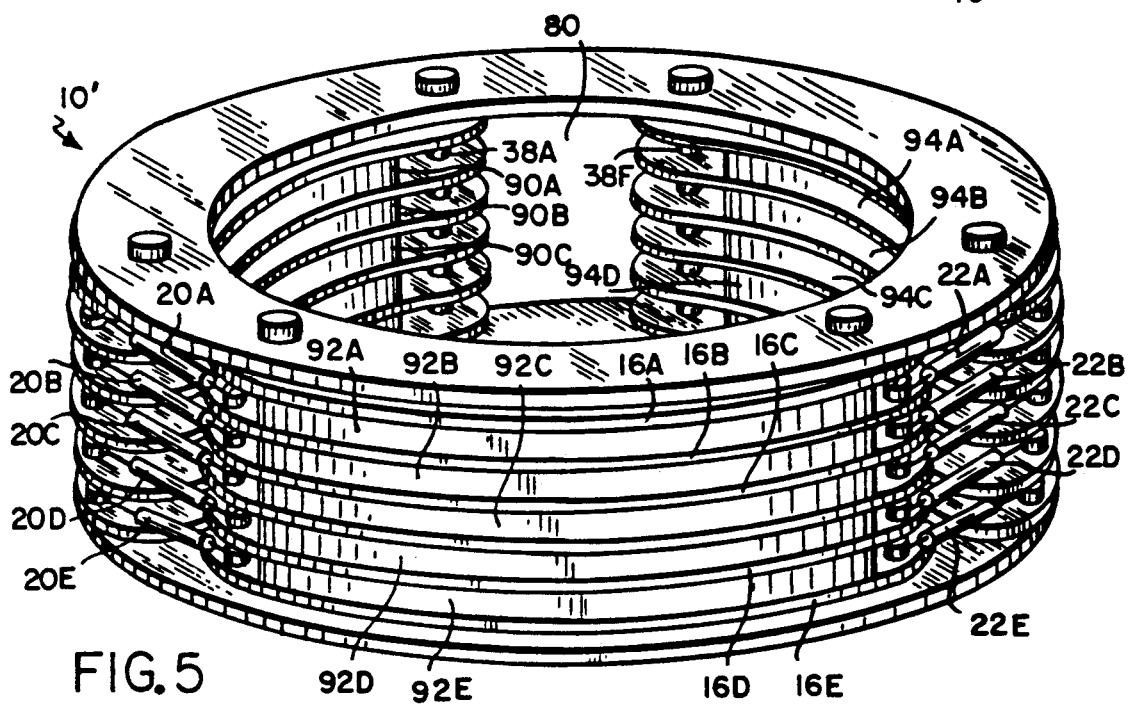
FIG. 5 is a front top perspective view of a power supply of an alternative embodiment of the invention.

FIG. 5 shows an alternative embodiment of the invention which offers several advantages over the embodiment shown in FIG. 1. This design differs from that shown in FIG. 1 only in that the discrete capacitors 28, 30 and 32 have been replaced by utilizing the plates 14, 16 and 18 as the plates of the capacitors and providing a dielectric 90, 92 and 94 which is shaped to substantially fill the area between corresponding plates which area is inside the posts 38. While, as will be apparent from the following discussion, there are advantages to having the dielectric substantially fill the space between the plates, this is by no means a limitation on the design, and other dielectric configurations ar possible. Except for the change in the capacitor configuration, the embodiment of the invention shown in FIG. 5 is substantially the same and functions in substantially the same manner as the embodiment of the invention previously described.

The configuration shown in FIG. 5 offers at least two advantages over the embodiment of the invention shown in FIG. 1. First, since the capacitance increases proportionately with the surface area of the capacitor, using the entire area between the plates results in increased capacitance. Since both the ripple voltage and the droop voltage are inversely proportional to the capacitance, this can result in substantial improvement in both of these characteristics. Second, since the space between the plates is primarily filled with dielectric, for example barium titonate or strontium titonate, the primary factor in determining the breakdown potential of each stage is the dielectric breakdown potential. Since the dielectric breakdown potential is typically 100 kv/cm, the spacing between the plates 12 could theoretically be reduced to as little as one-half centimeter for a 50 kv per stage gradient. The principal potential disadvantage of the configuration shown in FIG. 5 is that it requires the fabrication of special components rather than being able to utilize off the shelf components.

Figure 6:
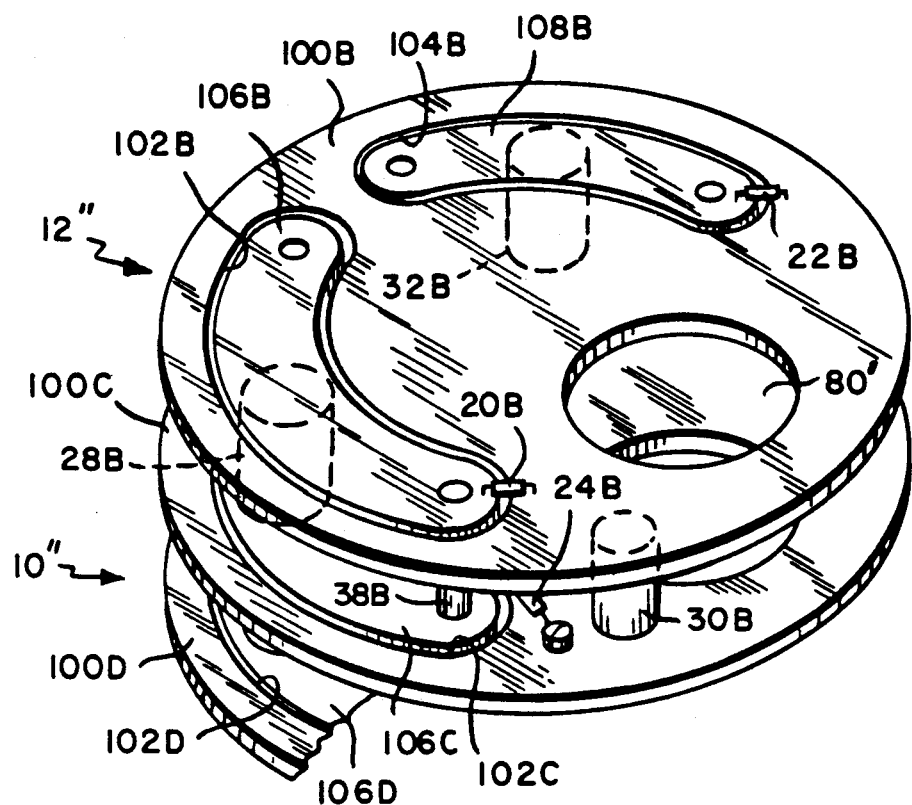
FIG. 6 is a partially cut away front top perspective view of a power supply of a second alterative embodiment of the invention.

FIG. 6 illustrates a power supply 10'' of still another embodiment of the invention. For this embodiment of the invention, the plates 12'' are each formed of a DC ring 100 having a pair of arc-shaped openings 102 and 104 formed therein. An AC arc-shaped plate 106 is mounted in each opening 102 and an arc shaped AC plate 108 is mounted in each opening 104. The plates 106 and 108 are sized so as to fit in the respective openings 102 and 104 but to be spaced from the walls thereof by a sufficient distance so as to prevent any arcing between electrodes. The AC and DC plates of each plate 12 are interconnected by diodes or other rectifier devices 20 and 22 in the manner previously described and the DC plates of one plate 12 are connected to the AC plates of the next higher level by diodes 24 and 26. There is a capacitor 30 between each pair of plates 100 and there are capacitors 28 and 32 respectively between each pair of AC plates 106 and 108. While discreet capacitors are shown for this embodiment of the invention, the capacitors for this embodiment of the invention may also be formed in the manner shown in FIG. 5. Similarly, while the AC plates 106 and 108 and the corresponding openings 102 and 104 are shown as arc shaped, this is not a limitation on the invention. Thus, the plates and openings could be circular or could have some other shape, preferably one without sharp corners so as to minimize the potential for hot spots.

The power supply shown in FIG. 6 operates in the same manner described above with respect to the power supplies of earlier embodiments. The configuration shown in FIG. 6 is advantageous in that the presence of AC potential near a load, such as an accelerator column, may cause breakdown in the power supply or accelerated column at lower potentials than if only DC potential is near the column. The configuration shown in FIG. 6 wherein the column 80, in which such a load may be positioned, is completely surrounded in D potential thus offers additional protection against breakdown occuring at a potential lower than the theoretical maximum potential for the device. The column 80 in which the load may be positioned is shown paraxial with the plates 100 in FIG. 6 rather than coaxial as for prior embodiments. The paraxial configuration may be preferable in some applications and for some embodiments of he invention to, for example, provide more room for plates 106 and 108, and related circuitry.

Figure 7:
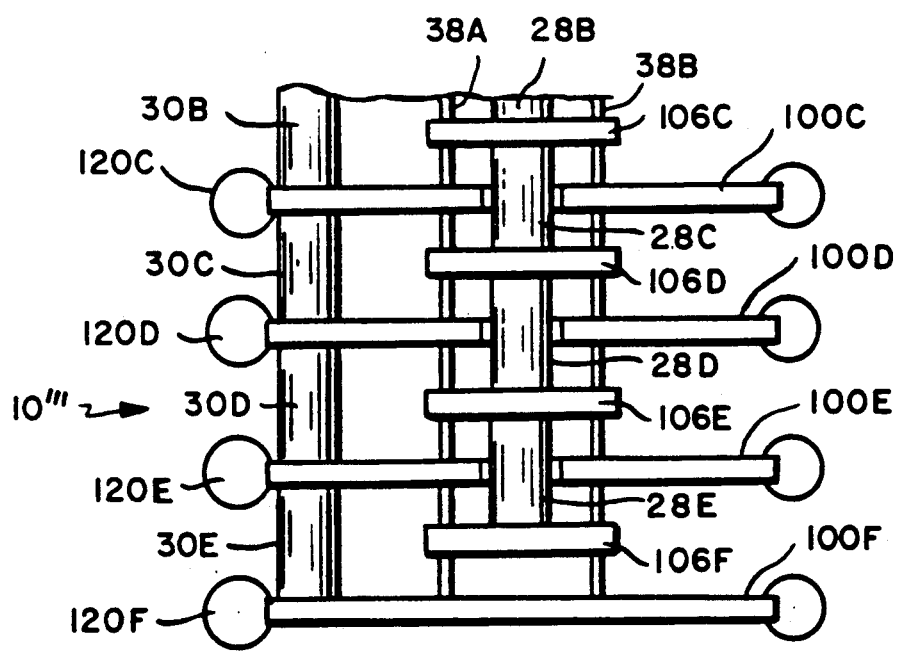
FIG. 7 is a partial front sectional view of a power supply of a third alternative embodiment of the invention.

FIG. 7 shows still another embodiment of the invention which differs from the embodiment of the invention shown in FIG. 6 in that, instead of the plates 106 and 108 being in the same plane as DC ring 100 for each plate 12, the plates 106 and 108 (only plates 106 being shown in FIG. 7) are in a plane spaced from the plane of the ring 100 such that, the DC potential at each plate 100 is roughly equal to the average potential mid way between plates 106 (or 108) on either side thereof. For example, the DC potential on plate 100D is equal to the average of the superimposed DC potentials for plates 106D and 106E. Thus, a uniform average potential exists in the plane of plates 100, improving the performance, and in particular the uniformity of the potential gradient, for the power supply. Openings 110 and 112

(only 110 of which is shown in FIG. 7) are provided in rings 100 through which capacitors 28 and 32 respectively pass. The openings in plates 100 are sufficiently large so that the capacitors may pass therethrough while leaving sufficient space between the capacitors and the ring 100 to prevent arcing.

FIG. 7 also illustrates another important feature of the invention. In certain applications, particularly where the cascade rectifier is mounted in a grounded vessel, the difference between the potential on the plates and at the grounded vessel can cause a curving of the electric field potentials at the sharp edges of the plates, resulting in potential "hot spots" at these edges. For reasons previously discussed, hot spots are undesirable in that they may cause breakdown between stages to occur below the optimum potential gradient for the stage.

To eliminate such edge hot spots, hoops 120 are provided around the outer edge of each plate 100 to smooth out the sharp corners. The hoops are formed of a conductive material which could be the same material as the material for the plates, aluminum for preferred embodiment, or another metal such as steel or copper. The hoops could have a circular shape as shown or could have a more elliptical shape.

While use of the hoops 120 has been found to be advantageous in applications where the cascade rectifier is in a sealed grounded vessel, which is the normal situation since it is preferable to operate such rectifiers in a pressurized insulating gas environment, the nonuniformity in the field resulting from the hoops themselves may cause use of the hoops to not be advantageous when operating in other environments.

While the hoops are illustrated only for the embodiment of FIG. 7, it is apparent that such hoops would be used with any of the embodiments of the invention where the cascade rectifier of such embodiment is used in a grounded vessel. Thus, for example, with the embodiment of FIGS. 1 and 2, the hoops would be formed on the outer periphery of each of the plates 14, 16, and 18. On the other hand, for the embodiment shown in FIG. 6, the hoops would be formed around the outer periphery of the DC plates 100 as for the embodiment shown on FIG. 7.

It is apparent from the discussion above that, while five to seven stages have been shown in the various figures, the actual number of stages employed in a particular power supply will depend on the gradient selected for each stage and on the required output voltage.

In addition, while arc shaped plates 14, 16 and 18 arranged to form a split circular ring are shown for the embodiments of FIGS. 1 and 5, the plates might be arranged to form an oval, or either the plates or the ring might assume some other appropriate shape. Similarly, the circular DC plates 100 and the arc shaped AC plate 106 and 108 for the embodiments of FIGS. 6 and 7 may also assume other appropriate shapes. It is however preferable that the shape of each of the plates and rings be such as to not result in any sharp edges. Further, while the preferred embodiments have all involved symmetric cascade rectifiers and symmetric rectifiers are clearly preferred because of their superior performance, the invention might also be practiced utilizing assymmetrical (for example Cockcroft-Walton) cascade rectifiers.

The various values and components indicated above for the various embodiments are provided by way of example only, and the invention is in no way limited to such components or values. In particular, other components adapted to perform the indicated functions may be utilized in each instances.

Thus, while the invention has been particularly shown and described above with reference to preferred embodiments, the foregoing and other changes in form and detail may be made therein by one skilled in the art without departing from the spirit and scope of the invention.

What is claimed is:

1. A high voltage multistage cascade rectifier power supply comprising:
equipotential conductor plate means on each side of each of said stages, each of said plate means including a DC potential plate means and an AC potential plate means;
capacitor means between the AC plate means and between the DC plate means defining each stage;
first rectifier means interconnecting selected DC plate means of one conductor plate means defining a given stage to selected AC plate means of the other conductor plate means defining the stage; and
second rectifier means for interconnecting selected DC and AC plate means of a given conductor plate means.

2. A power supply as claimed in claim 1 wherein each of said conductor plate means is ring shaped.

3. A power supply as claimed in claim 2 wherein each of said conductor plate means is a split ring formed of a plurality of spaced arc-shaped conductor plates.

4. A power supply as claimed in claim 3 wherein said split ring is circular.

5. A power supply as claimed in claim 3 wherein said cascade rectifier is a symmetrical cascade rectifier; wherein there are three of said arc shaped plates, two of said plates forming said AC plate means and the third plate forming said DC plate means.

6. A power supply as claimed in claim 5 wherein said second rectifier means includes a rectifier connecting each of said plates of the AC plate means to the plate of the corresponding DC plate means.

7. A power supply as claimed in claim 2 wherein each of said DC plate means is in the form of a substantially ring shaped plate having at least one opening formed therein, and wherein each of said AC plate means is in the form of at least one conductor plate.

8. A power supply as claimed in claim 7 wherein the conductor plates of each AC plate means are fitted in, but spaced from, corresponding openings in the ring forming the corresponding DC plate means.

9. A power supply as claim in claim 7 wherein the conductor plates forming each AC plate means are aligned with the openings of the corresponding DC plate means ring and have an average potential at each point therebetween, and wherein the AC plate means are spaced from the corresponding DC plate means to be at a level such that the average potential between the AC plates at the level of said DC ring is substantially equal to the DC potential at the ring.

10. A power supply as claimed in claim 9 wherein the capacitor means between corresponding AC plates for a stage pass through, but do not touch a corresponding opening in the DC ring for such stage.

11. A power supply as claimed in claim 7 wherein said second rectifier means includes a rectifier connecting each of said plates of the AC plate means to the ring of the corresponding DC plate means.

12. A power supply as claimed in claim 7 including an additional opening through, and surrounded by, each DC plate means, said additional openings forming a channel having substantially uniform potential gradient, which channel is paraxial with an axis of said power supply.

13. A power supply as claimed in claim 12 wherein said channel is coaxial with an axis of the power supply.

14. A power supply as claimed in claim 1 wherein the AC plate means and the DC plate means of each conductor plate means are separate conductor plates; and
wherein said capacitor means are discrete capacitors connected between corresponding conductor plates of the plate means defining each stage 15. A power supply a claimed in claim 1 wherein the AC plate means and the DC plate means of each conductor plate means are separate conductor plates; and
wherein the capacitor means are formed with corresponding conductor plates of the plate means defining each stage serving as the plates for the capacitor means, with dielectric means in the space between such corresponding plates.

16. A power supply as claimed in claim 15 wherein said dielectric means substantially fills the space between corresponding plate means.

17. A power supply as claimed in claim 1 including means for applying an input drive voltage $V_i$ at a frequency f to a first stage of the power supply, means for taking an output at power $P_o$ from the power supply, said power supply having a stray capacitance $C_s$ shunting the input drive applying means, and wherein the design of said power supply is such that the following inequality is satisfied:

$$V_i^2 f > \frac{P_o}{4\Pi C_s}$$

18. A power supply as claimed in claim 17 including means for tuning out the stray capacitance at the frequency f.

19. A power supply as claimed in claim 18 wherein said means for tuning out includes means for compensating for variations in the stray capacitance value.

20. A power supply as claimed in claim 1 wherein said power supply has a stray shunt capacitance $C_s$, and including means for tuning out the stray capacitance at a selected frequency.

21. A power supply as claimed in claim 20 including means for generating an input drive voltage at the selected frequency;
a step-up driver transformer having a primary and a secondary winding;
means for applying the input drive voltage to the transformer primary winding;
means for connecting the output from the transformer secondary winding as the input drive voltage to a first stage of the power supply; and
wherein said means for tuning out includes an inductor of suitable value connected across at least one of said transformer windings.

22. A power supply as claimed in claim 21 wherein said inductor is connected across the primary winding of the transformer.

23. A power supply as claimed in claim 20 said means for tuning out includes means for compensating for variations in the stray capacitance value.

24. A power supply as claimed in claim 23 including means for generating an input drive voltage at the selected frequency; and
means for automatically adjusting the frequency of the input drive to compensate for changes in the stray capacitance of the power supply.

25. A power supply as claimed in claim 24 wherein said automatic adjusting means includes a voltage controlled oscillator which controls the frequency of the input drive, means for detecting the phase of the drive voltage generating means, means for detecting the phase of the output from the drive voltage generating means, means for comparing the detected phases, and means responsive to a difference in the compared phases for controlling the output frequency of said voltage controlled oscillator.

26. A power supply as claimed in claim 1 wherein said conductor plate has an outer periphery; and including a conductive hoop on said outer periphery.

27. A power supply as claimed in claim 26, wherein each of said conductor plate means is a split ring formed of a plurality of spaced conductor plate; and wherein said hoop is on the outer periphery of each conductor plate.

28. A power supply as claimed in claim 26 wherein each of said DC plate means is in the form of a substantially ring shaped plate having at least one opening formed therein, and wherein each of said AC plate means is in the form of at least one conductor plate; and wherein said hoop is on the outer periphery of each DC plate means.

29. A high voltage multistage cascade rectifier power supply comprising:
means for establishing an equipotential between each of said stages;
means for applying an input drive voltage $v_i$ at a frequency f to a first stage of the power supply;
means for taking an output at power $P_o$ from the power supply, said power supply having a stray shunt capacitance $C_s$;
wherein the design of said power supply is such that the following inequality is satisfied:

$$V_i^2 f > \frac{P_o}{4\Pi C_s} \; ; \text{ and}$$

means for tuning out the stray capacitance at the frequency f.

30. A power supply as claimed in claim 22 wherein said means for tuning out includes means for compensating for variations in the stray capacitance value.

* * * * *